(12) United States Patent
An et al.

(10) Patent No.: US 8,398,853 B2
(45) Date of Patent: Mar. 19, 2013

(54) FILTER ASSEMBLY, VALVE ASSEMBLY, AND WATER PURIFYING SYSTEM HAVING THE SAME

(75) Inventors: Jae Koog An, Gwanglu (KR); Sang Min Park, Gwanglu (KR); Young Gwl Park, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 504 days.

(21) Appl. No.: 12/654,677

(22) Filed: Dec. 29, 2009

(65) Prior Publication Data

US 2010/0170841 A1    Jul. 8, 2010

(30) Foreign Application Priority Data

Jan. 7, 2009    (KR) .................. 10-2009-0001239

(51) Int. Cl.
*B01D 35/153*    (2006.01)
(52) U.S. Cl. ........ 210/235; 210/234; 210/420; 210/421; 210/444; 137/594; 137/595; 251/149.1; 251/149.6
(58) Field of Classification Search .................. 210/420, 210/421, 135, 234, 235, 444; 137/594, 595; 251/149.1, 149.6
See application file for complete search history.

(56) References Cited

U.S. PATENT DOCUMENTS

| | | | |
|---|---|---|---|
| 2,544,244 A | 3/1951 | Vokes | |
| 3,399,776 A | 9/1968 | Knuth | |
| 3,715,032 A | 2/1973 | Nicko | |
| 3,852,196 A | 12/1974 | Szpur | |
| 7,445,710 B2 * | 11/2008 | Stankowski et al. | 210/232 |
| 2004/0211931 A1 | 10/2004 | Olson et al. | |
| 2008/0156711 A1 | 7/2008 | Vitan et al. | |
| 2008/0223775 A1 * | 9/2008 | An | 210/234 |

OTHER PUBLICATIONS

European Search Report for corresponding European Patent Application No. 10150083.3 dated Mar. 19, 2010 (in English).

* cited by examiner

*Primary Examiner* — Ling Choi
*Assistant Examiner* — Catherine S Branch
(74) *Attorney, Agent, or Firm* — Staas & Halsey LLP

(57) ABSTRACT

A water purifying system having a bypass path supplies raw water to an outlet when a filter assembly is separated from a valve assembly. The water purifying system includes a valve assembly having a valve cover with an inlet and an outlet, and a head member moved up and down within the valve cover to form an inflow path and an outflow path, and a filter assembly removably connected to the valve assembly and mounted with a filter. When the filter assembly is connected to the valve assembly through a linear motion, the filter assembly advances the head member so that a fluid flown in through the inlet is guided to the outlet passing through the filter. When the filter assembly is separated from the valve assembly, the head member is retreated so that the fluid flown through the inlet is guided to the outlet bypassing the filter.

12 Claims, 8 Drawing Sheets

FILTER ASSEMBLY, VALVE ASSEMBLY, AND WATER PURIFYING SYSTEM HAVING THE SAME

CROSS-REFERENCE TO RELATED APPLICATIONS

This application claims the benefit of Korean Patent Application No. 2009-0001239, filed on Jan. 7, 2009 in the Korean Intellectual Property Office, the disclosure of which is incorporated herein by reference.

BACKGROUND

1. Field

Embodiments of the present invention relate to a water purifying system having a filter assembly and a valve assembly to which the filter assembly is removably connected.

2. Description of the Related Art

Recently, home appliances such as a refrigerator, a water purifier, a coffee maker, a washing machine, a dish washer, and a bidet are equipped with a water purifying system that filters raw (unpurified) water, for example tap water, to clean water to properly perform their respective functions. Hereinafter, a refrigerator will be explained as an example of a home appliance employing the water purifying system.

Some refrigerators being currently used are equipped with a water purifying system therein to supply purified water or make ice using the purified water.

A filter assembly is built in the water purifying system as a consumable product requiring periodic replacement. In order for a smooth replacement of the filter assembly, water supply to the filter assembly must be suspended prior to the replacement.

That is, raw water is not supplied while the replacement of the filter assembly is being performed in the water purifying system, and therefore clean water may not be discharged although water supply is required for an ice making or water dispensing operation.

To solve this dilemma, a valve which opens and closes a pipe connected to a water supply source has been installed in a machine chamber of the refrigerator.

More specifically, when a refrigerating chamber door is opened to replace the filter assembly, a door switch installed near the door senses the opening of the door and transmits an electric signal commanding closing of the valve. Upon transmission of the electric signal from the door switch, a magnetic field is generated and the valve is therefore closed by magnetism of the magnetic field.

However, as described above, the above structure requires a dedicated electric system including a door switch, a solenoid valve and the like, which complicates a water purification path of the refrigerator.

SUMMARY

Therefore, it is an aspect of the present invention to provide a water purifying system having a bypass path to enable supply of raw water to an outlet even when a filter assembly is not connected to a valve assembly.

It is another aspect of the present invention to provide a water purifying system having a path structure capable of preventing purified water and raw water from mixing with each other.

It is a further aspect of the present invention to provide a water purifying system having a filter assembly conveniently connected to and separated from a valve assembly.

It is a further aspect of the present invention to provide a water purifying system improving durability of a connection part between a valve assembly and a filter assembly.

Additional aspects of the invention will be set forth in part in the description which follows and, in part, will be apparent from the description, or may be learned by practice of the invention.

The foregoing and/or other aspects of the present invention are achieved by providing a water purifying system including a valve assembly which includes a valve cover defining an external appearance of the water purifying system and including an inlet and an outlet, and a head member mounted to be movable in up and down directions within the valve cover to form an inflow path and an outflow path respectively in fluid communication with the inlet and the outlet; a filter assembly removably connected to the valve assembly and including a filter therein, wherein the filter assembly linearly advances the head member when the filter assembly is connected to the valve assembly through a linear motion, so that a fluid passing through the inlet is passed through the filter and then guided to the outlet, and the head member is retreated linearly when the filter assembly is separated from the valve assembly, so that the fluid passing through the inlet is guided to the outlet without passing through the filter.

The water purifying system may further include a pair of valve units mounted to the head unit to open and close the inflow path and the outflow path, respectively.

The head member may seal a space between an outer surface of the head member and an inner surface of the valve cover by linearly moving.

The water purifying system may further include a supporting member provided to the valve assembly to support a secure mounting of the filter assembly with respect to the valve assembly.

The valve assembly may be inserted in the filter assembly through the supporting member and rotated, thereby being fixed to the supporting member.

The valve assembly may include the inflow path, the outflow path, and a bypass path formed between an inner surface of the valve cover and the head member, and the inflow path, the outflow path and the bypass path are selectively opened and closed.

When the filter assembly is mounted, the valve unit may open the inflow path and the outflow path and an outer surface of the head member may be brought into close contact with the inner surface of the valve cover, thereby closing the bypass path.

When the filter assembly is separated, the valve unit may close the inflow path and the outflow path and the outer surface of the head member may be distanced from the inner surface of the valve cover, thereby opening the bypass path.

The filter assembly may include a filter head connected with the valve assembly, and the filter head may include a first opening part protruded in the center with a first opening formed on an upper surface thereof, and a second opening part formed around the first opening part with a plurality of second openings circumferentially arranged at predetermined intervals on the upper surface thereof.

The first opening part may include a sealing member mounted at an outer circumference thereof to partition the inflow path from the outflow path.

The water purifying system may further include a supporting member that supports a secure mounting of the filter assembly with respect to the valve assembly, wherein the filter head includes a connection part engaged with the supporting member.

The foregoing and other aspects of the present invention are achieved by providing a valve assembly formed with a water purification path and a bypass path therein which are selectively opened and closed in accordance with a linear motion of a filter assembly, including a valve cover forming an external appearance of the valve assembly; a head member mounted to be movable in up and down directions within the valve cover to open and close the bypass path; and a pair of valve units mounted to the head member to open and close the water purification path.

The head member may further include a first sealing member that closes the bypass path when the head member is moved upward.

Each of the pair of valve units may include a valve body, an elastic member supplying elasticity in a direction for the valve body to close the inflow path, and a second sealing member disposed between the valve body and the water purification path to maintain airtightness between the valve body and the water purification path as long as no external force is applied.

The foregoing and/or other aspects of the present invention are achieved by providing a filter assembly removably connected to a valve assembly having an inflow path, an outflow path, and a bypass path therein, including a filter head connected with the valve assembly, wherein the filter head comprises a first opening part having a portion protruded from the center thereof, having a first opening formed on an upper surface to be fluidly communicated with any one of the inflow path and the outflow path, and a second opening part having a plurality of second openings arranged around the first opening part at predetermined intervals and fluidly communicated with the other one of the inflow path and the outflow path.

The first opening part may include a third sealing member mounted at an outer circumference thereof to partition the inflow path from the outflow path.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
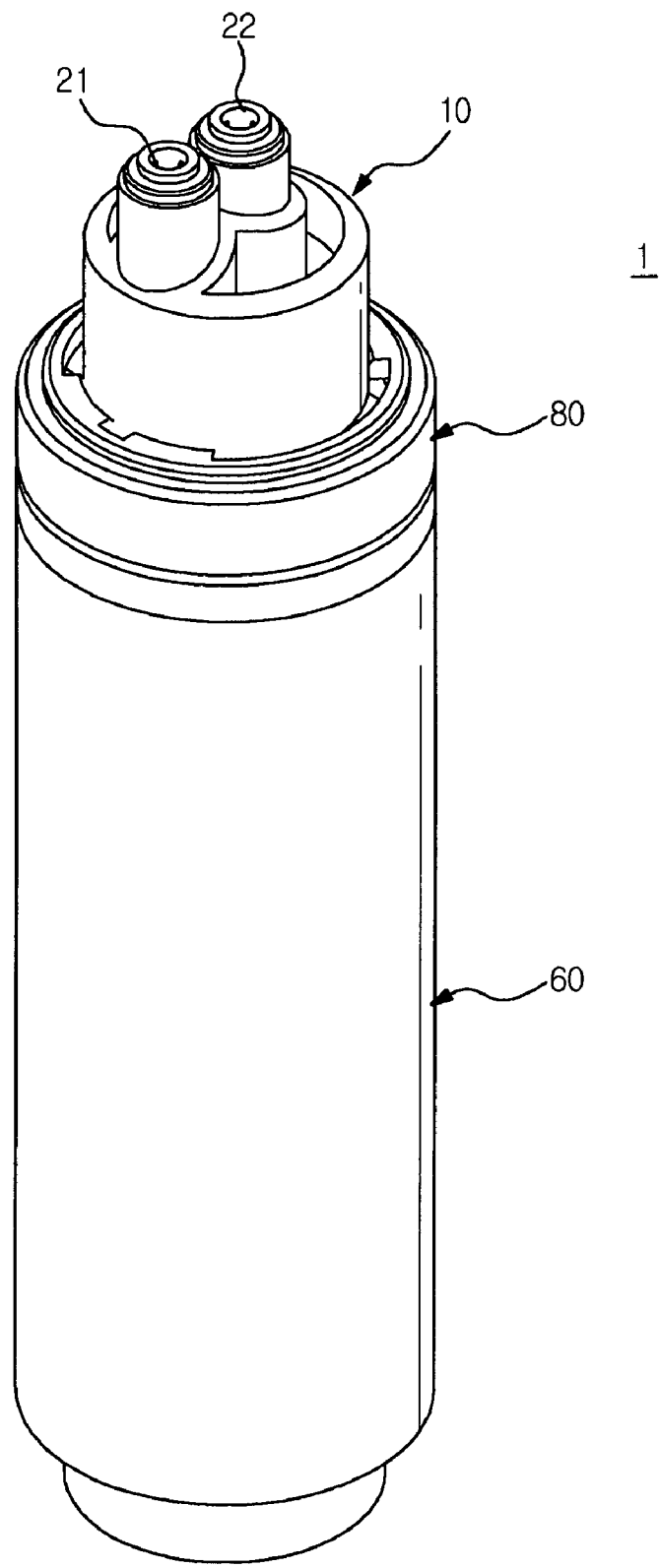
FIG. 1 is a perspective view showing the external appearance of a water purifying system according to an embodiment of the present invention.

Reference will now be made in detail to the embodiments, examples of which are illustrated in the accompanying drawings, wherein like reference numerals refer to the like elements throughout. The embodiments are described below to explain the present invention by referring to the figures.

Figure 2:
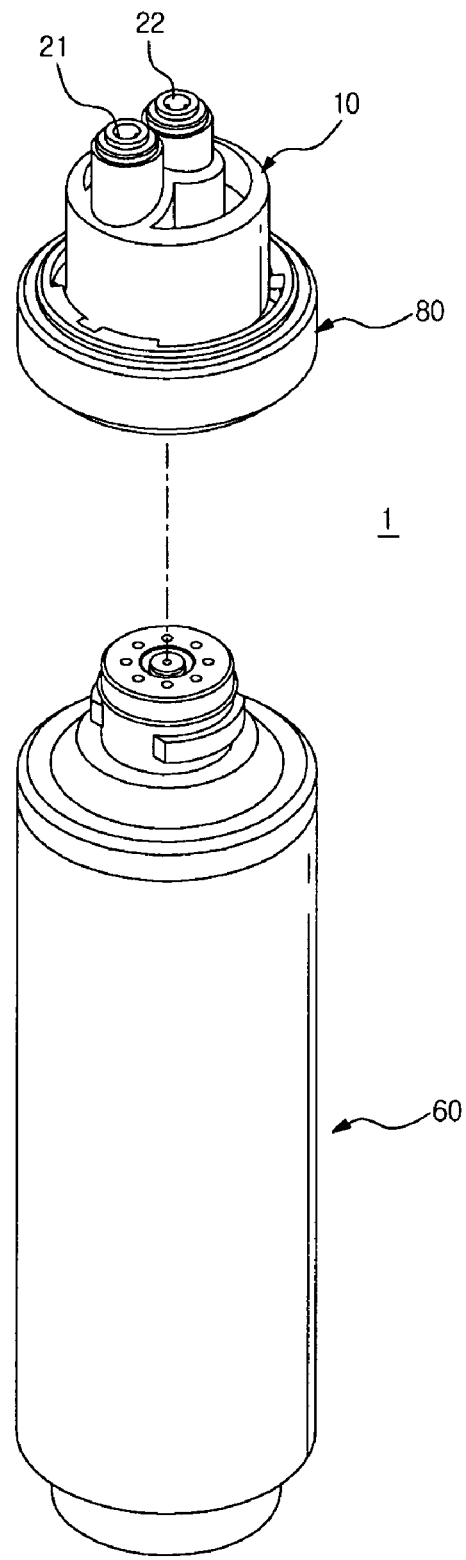
FIG. 2 is a perspective view of the water purifying system in which a filter assembly and a valve assembly are separated.

FIG. 1 is a perspective view showing the external appearance of a water purifying system according to an embodiment of the present invention, and FIG. 2 is a perspective view of the water purifying system in which a filter assembly and a valve assembly are separated.

Figure 3:
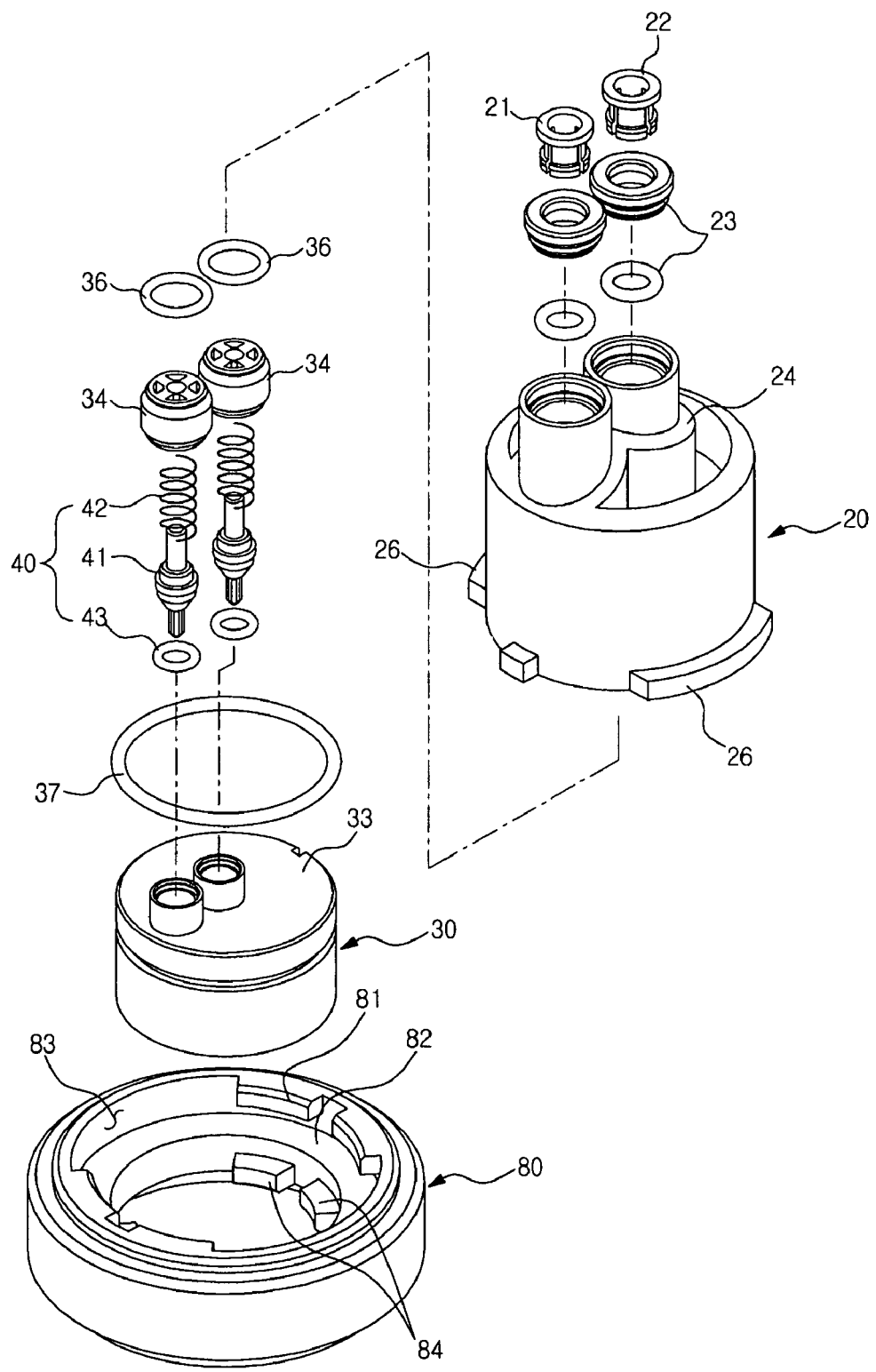
FIG. 3 is an exploded perspective view of the valve assembly and a supporting member of the water purifying system.
Figure 4:
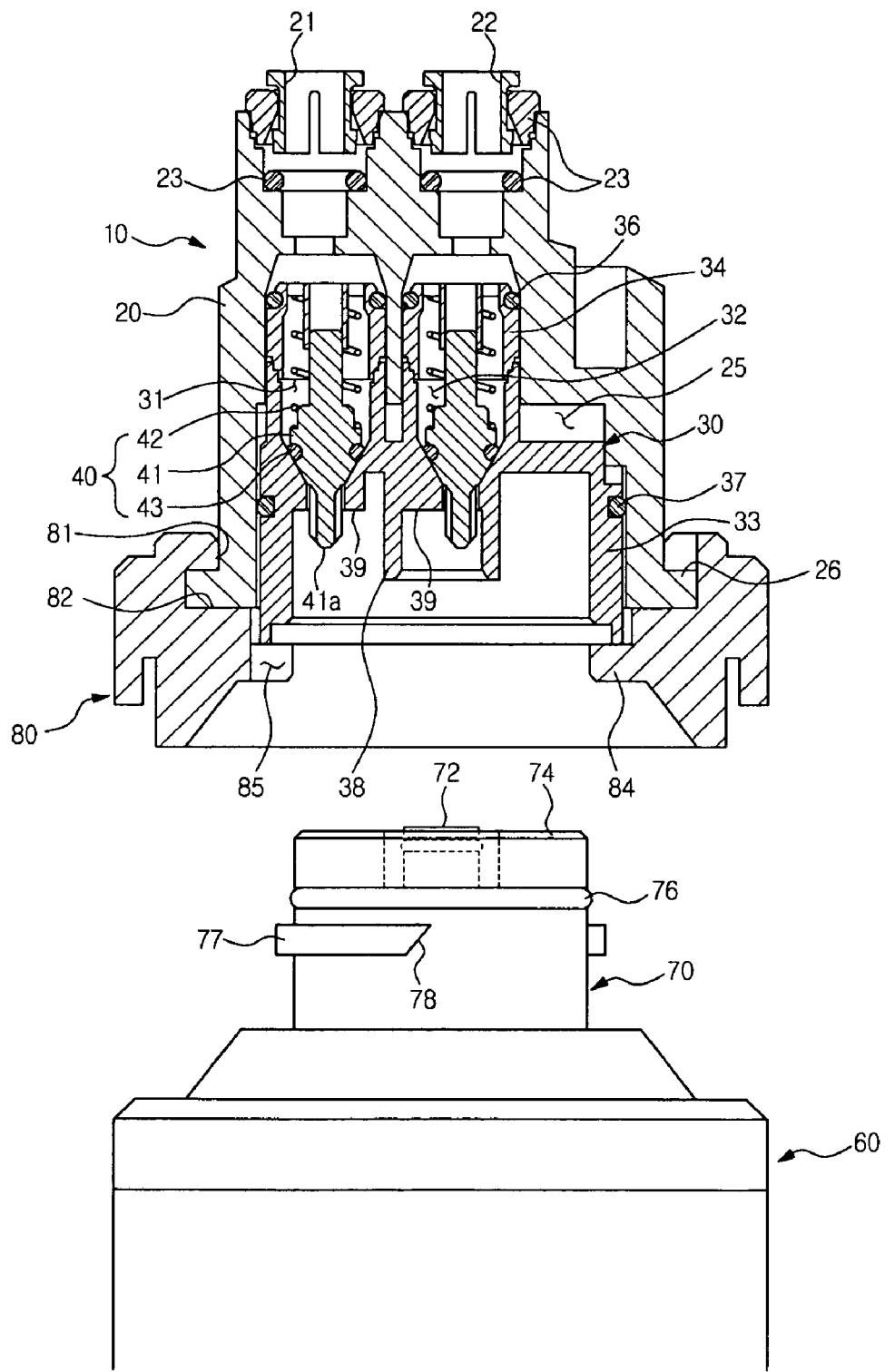
FIG. 4 is a sectional view of the valve assembly and the supporting member of the water purifying system, connected with each other.
Figure 5:
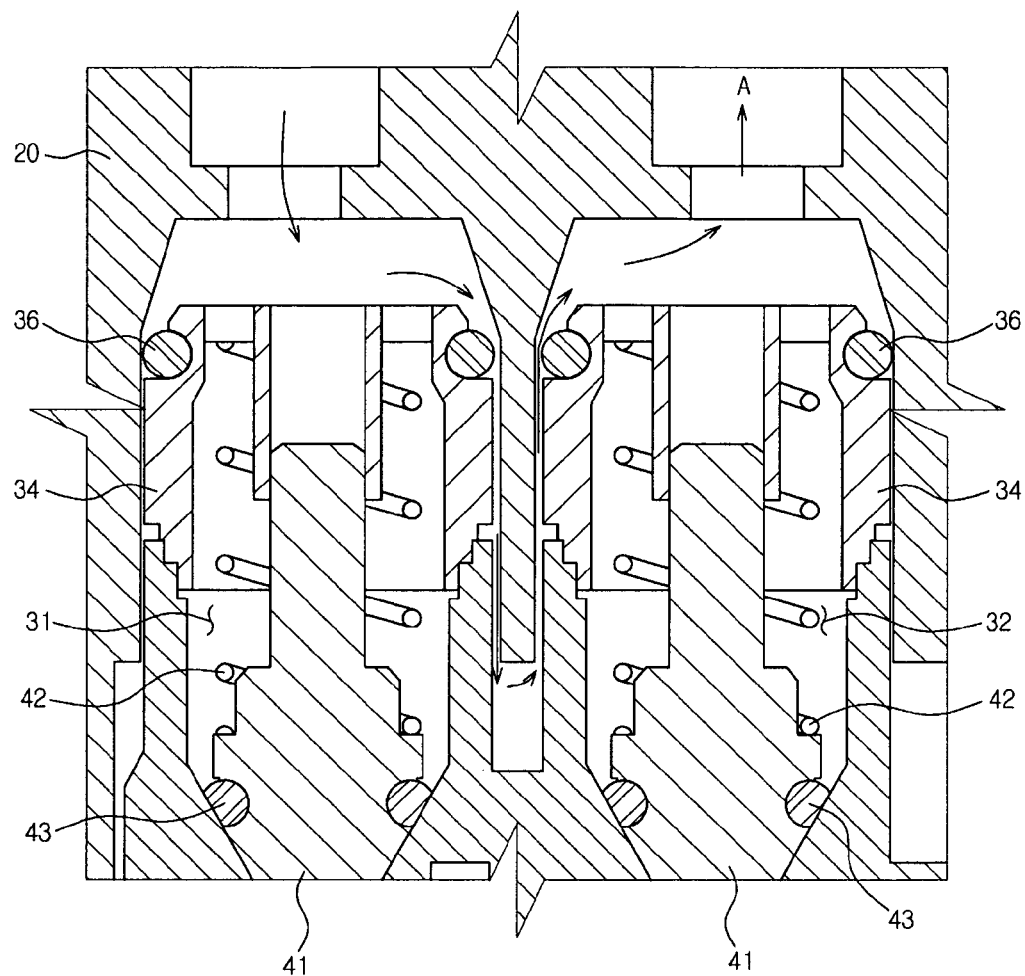
FIG. 5 is an enlarged view showing main parts of FIG. 4.

FIG. 3 is an exploded perspective view of the valve assembly and a supporting member of the water purifying system. FIG. 4 is a sectional view of the valve assembly and the supporting member of the water purifying system, connected with each other and FIG. 5 is an enlarged view showing main parts of FIG. 4.

A water purifying system 1 according to the embodiment of the present invention includes a valve assembly 10 equipped with an inlet 21 and an outlet 22, and a filter assembly 60 built with a filter 61 therein and removably connected to the valve assembly 10.

The water purifying system 1 may further include a supporting member 80 to fix the filter assembly 60 to the valve assembly 10.

The supporting member 80 is fixedly mounted to the filter assembly 60, and the filter assembly 60 is securely connected with the valve assembly 10 through the supporting member 80.

As shown in FIG. 3 and FIG. 4, the valve assembly 10 includes a valve cover 20 defining the external appearance thereof and having the outlet 22, a head member 30 forming an inflow path 31 and an outflow path 32 (including outlet B) in fluid communication with the inlet 21 and the outlet 22, respectively, being mounted to be movable up and down in the valve cover 20, and a pair of valve units 40 mounted to the head member 30 to open and close the inflow path 31 and the outflow path 32, respectively.

The valve cover 20 is shaped to receive the head member 30 therein. The valve cover 20 includes the inlet 21 connected to a supply pipe (not shown) supplying water from a water supply source, and the outlet 22 connected to a discharge pipe (not shown) discharging purified water or raw water guided in through the inlet 21.

The inlet 21 and the outlet 22 are disposed on an upper surface 24 of the valve cover 20 so that the water is supplied and discharged in up and down directions.

The inlet 21 and the outlet 22 each have a sealing member 23 for airtight connection with the supply pipe and the discharge pipe, respectively.

A center hole 25 is formed in the valve cover 20 to mount of the head member 30. A space between the inlet 21 and the center hole 25 is fluidly communicated with a space between the center hole 25 and the outlet 22.

Although the inlet 21 is disposed at an upper outer position of the valve cover 20 while the outlet 22 is disposed at an inner position according the embodiment of the present invention, the positions of the inlet 21 and the outlet 22 may be exchanged as necessary according to the structure of the filter assembly.

A flange part 26 is formed on a lower circumference of the valve cover 20 to enable connection of the valve cover 20 to the supporting member 80. A locking protrusion 81 is formed on an inner circumference of the supporting member 80.

In addition, a mounting part 82 is protruded on the inner circumference of the supporting member 80 in a radially inward direction to receive the lower outer circumference of the head member 30.

According to the above structure, the flange part 26 of the valve cover 20 is disposed corresponding to a flange recess 83 formed between two further locking protrusions 81 of the supporting member 80 and the valve cover 20 is moved downward so that the flange part 26 is inserted in the flange recess 83.

After the flange part 26 is thus inserted in the flange recess 83 until a lower surface of the flange part 26 is supported by an upper surface of the mounting part 82, the valve cover 20 is rotated in a circumferential direction so that the flange part 26 is inserted in a space between the locking protrusion 81 and the mounting part 82, thereby being fixed to the supporting member 80.

The head member 30 is mounted in the center hole 25 of the valve cover 20 to be movable in up and down directions. A water purification path is formed in the head member 30, including the inflow path 31 fluidly communicated with the inlet 21 to guide a fluid flown in through the inlet 21 toward the filter assembly 60 and the outflow path 32 fluidly communicated with the outlet 22 to guide the fluid from the filter assembly 60 toward the outlet 22.

The head member 30 may include a head main body 33, and a cap part 34 connected to an upper part of the head main body 33.

The inflow path 31 and the outflow path 32 are defined by spaces formed as the head main body 33 and the cap part 34 are connected.

As shown in FIG. 5, a bypass path A is formed between the head member 30 and the valve cover 20 to detour around the filter assembly 60 such that the fluid flown into the inlet 21 is discharged directly through the outlet 22.

Figure 7:
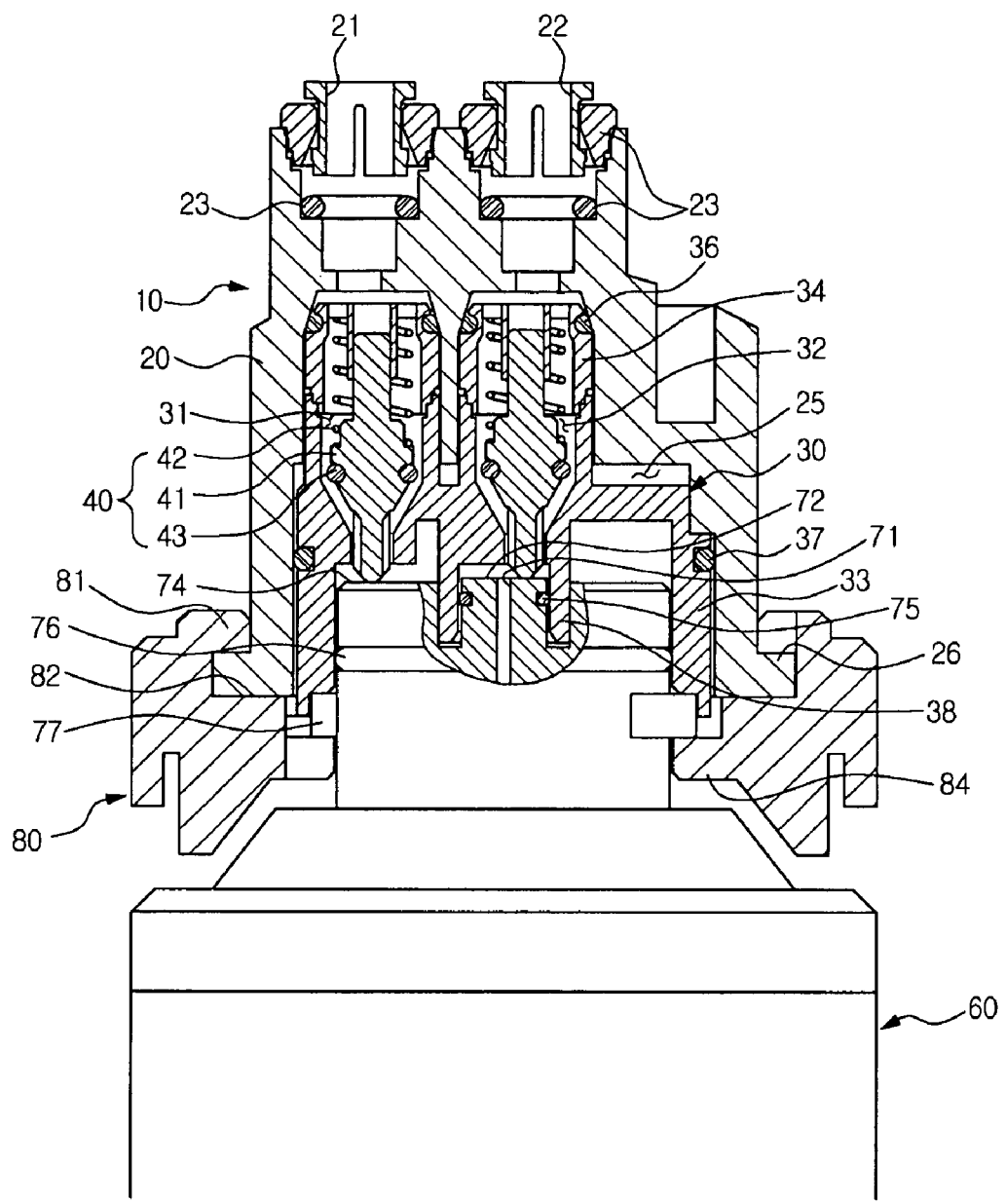
FIG. 7 is a sectional view showing the filter assembly and the valve assembly of the water purifying system, connected with each other.
Figure 8:
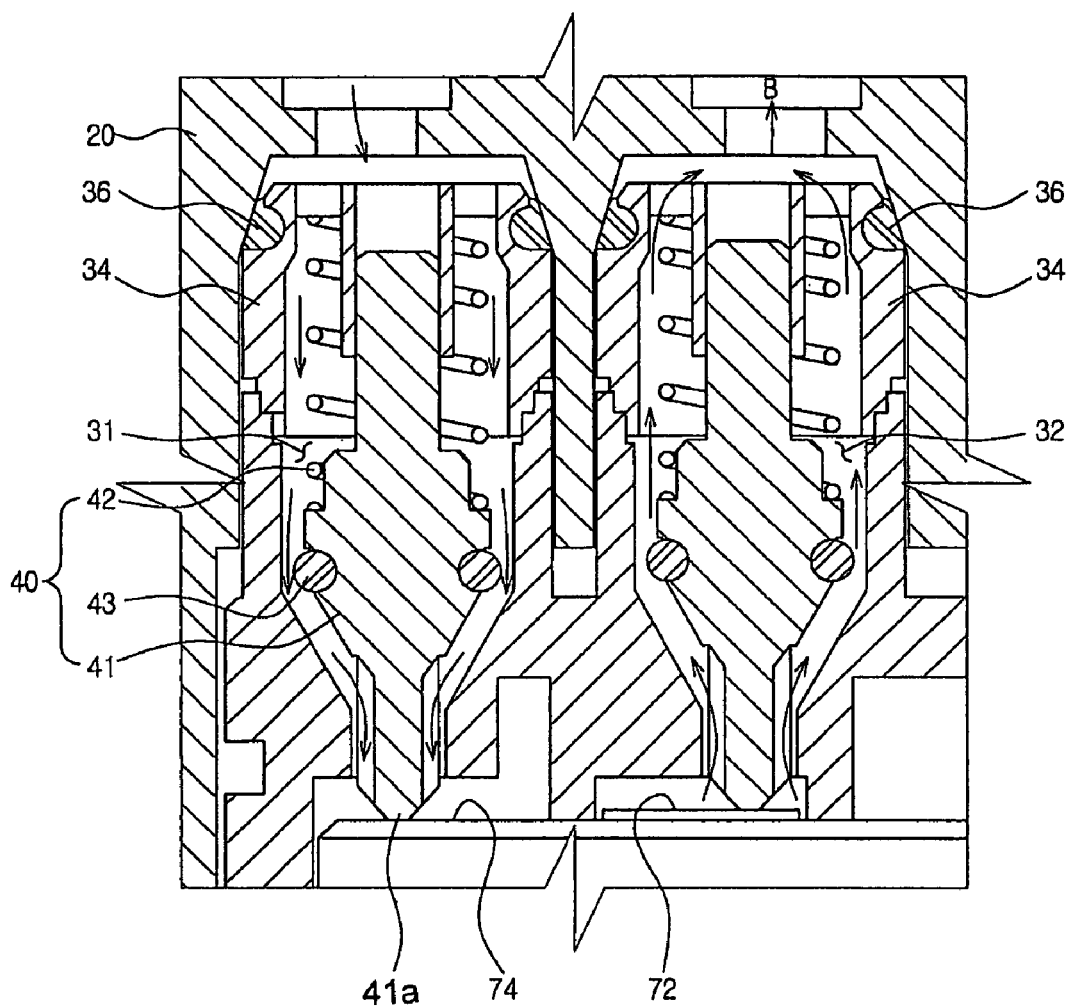
FIG. 8 is an enlarged view showing main parts of FIG. 7.

The bypass path A is defined as a space between an outer surface of the head member 30 and an inner surface of the valve cover 20. Therefore, when the filter assembly 60 is mounted, the head member 30 is moved upward, thereby sealing the space, that is, closing the bypass path A as shown in FIG. 7 and FIG. 8. When the filter assembly 60 is separated from the valve assembly 10, the head member 30 is moved downward, thereby opening the sealed space, that is, opening the bypass path A.

The head member 30 is mounted in the center hole 25 of the valve cover 20 to be slid upward and downward. When the filter assembly 60 is mounted, a connection part 77 of the filter assembly 60 pushes a lower end of the head member 30 upward, thereby enabling the head member 30 to move upward. The connection part 77 will be described hereinafter.

A first sealing member 36 is provided to an outer circumference of the cap part 34 so as to seal the bypass path A according to an upward sliding operation of the head member 30. The inner surface of the valve cover 20 corresponding to the outer circumference of the cap part 34 has a tapered shape with its diameter gradually reduced.

Accordingly, when the filter assembly 60 is inserted in the supporting member 80 and the head member 30 is moved upward by a predetermined distance, the first sealing member 36 is brought into close contact with the inner surface of the valve cover 20. As a result, the bypass path A is closed.

In this state, when the filter assembly 60 is separated from the valve assembly 10 and the raw water is supplied through the inlet 21, the head member 30 is slid downward by pressure of the raw water. Upon the downward movement of the head member 30 by a predetermined distance, the first sealing member 36 is separated from the inner surface of the valve cover 20, thereby opening the bypass path A.

Here, when the raw water is supplied through the inlet 21 with the filter assembly 60 separated, the raw water may be discharged to the outside of the head member 30 through the space between the valve cover 20 and the head member 30. To prevent such an undesired leakage of the raw water, a second sealing member 37 is mounted to an outer circumference of the head main body 33 so that airtightness is maintained between the outer circumference of the head main body 33 and the inner surface of the valve cover 20.

Although the present embodiment is structured in such a manner that the first and second sealing members 36 and 37 are mounted at the outer circumferences of the cap part 34 and the head main body 33, respectively, embodiments of the present invention are not limited to this structure. That is, the first and second sealing members 36 and 37 may be provided to both or any one of the outer circumference of the head member 30 and the inner circumference of the valve cover 20.

The head member 30 is mounted to the supporting member 80 by being inserted in the center hole 25 of the valve cover 20. In the supporting member 80, a supporting part 84 is protruded in a radially inward direction at a lower part of the mounting part 82 to support the lower end of the head member 30, thereby preventing the head member 30 from escaping the valve cover 20.

The valve units 40 are provided respectively on the inflow path 31 and the outflow path 32 to open and close the inflow path 31 and the outflow path 32. Since the valve units 40 are provided both to the inflow path 31 and the outflow path 32 in the same manner, the valve unit 40 formed at the inflow path 31 will only be explained hereinafter while omitting explanation about the valve unit 40 of the outflow path 32.

The valve unit 40 includes a valve body 41, an elastic member 42 supplying elasticity in a direction for the valve body 41 to close the inflow path 31, and a third sealing member 43 disposed between an outer circumference of the valve body 41 and the inner circumference of the inflow path 31 to maintain airtightness between the valve body 41 and the inflow path 31 as long as no external force is applied.

A lower end 41a of the valve body 41 is extended downward and exposed from an inner lower surface 39 of the head member 30, such that the lower end 41a of the valve body 41 is brought into contact with an upper surface of the filter assembly 60 when the filter assembly 60 is mounted.

Therefore, when the filter assembly 60 is mounted to the valve assembly 10, as the upper surface of the filter assembly 60 pushes the valve body 41 upward, the elastic member 42 is compressed and accordingly the valve body 41 is moved upward, thereby opening the inflow path 31 and the outflow path 32. Simultaneously, since the connection part 77 of the filter assembly 60 moves the head member 30 upward, the bypass path A is closed by the first sealing member 36.

When the inflow path 31 and the outflow path 32 are opened by mounting of the filter assembly 60 to the valve assembly 10, a fluid flown into the inlet 21 is guided to the filter assembly 60 through the inflow path 31. Here, a path partition 38 is formed between the inflow path 31 and the outflow path 32 such that the fluid flown in through the inflow path 31 is guided directly to the outflow path 32 by bypassing the filter assembly 60.

When the filter assembly 60 is separated from the valve assembly 10, the force of the filter assembly 60 pushing the valve body 41 upward is removed. Therefore, the elastic member 42 returns to its initial position, thereby moving the valve body 41 downward. As a result, the inflow path 31 and the outflow path 32 are closed.

Figure 6:
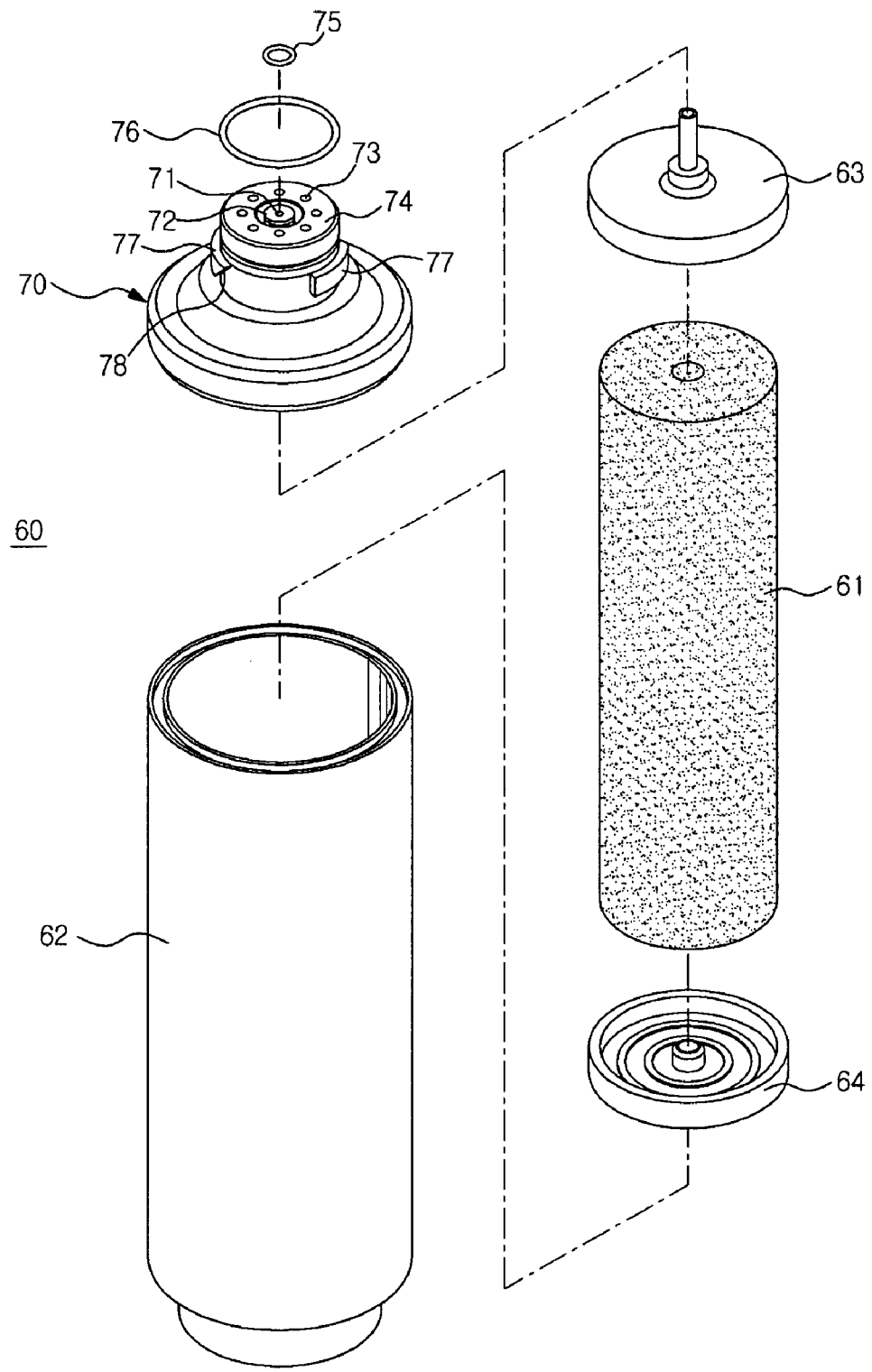
FIG. 6 is an exploded perspective view of the filter assembly of the water purifying system according to the embodiment of the present invention.

FIG. 6 is an exploded perspective view of the filter assembly of the water purifying system according to the embodiment of the present invention. FIG. 7 is a sectional view showing the filter assembly and the valve assembly of the water purifying system, connected with each other and FIG. 8 is an enlarged view showing main parts of FIG. 7.

Referring to FIG. 2 and FIG. 6, the filter assembly 60 includes the filter 61, a filter case 62 mounting the filter 61 therein, and a filter head 70 connected with the valve assembly 10.

The filter case 62 includes an upper cap 63 forming an upper part thereof and a lower cap 64 forming a lower part thereof.

The filter head 70 is protruded in the center of the filter assembly 60, and may include a first opening part 72 having a first opening 71 fluidly communicated with any one of the inflow path 31 and the outflow path 32 on an upper surface thereof, and a second opening part 74 having a plurality of second openings 73 arranged around the first opening part 72 at predetermined intervals and fluidly communicated with the other one of the inflow path 31 and the outflow path 32.

According to the present embodiment, the inflow path 31 is in fluid communication with the second openings 73 whereas the outflow path 32 is in fluid communication with the first opening 71.

The third sealing member 75 partitioning the inflow path 31 and the outflow path 32 from each other is formed at the outer circumference of the first opening part 72. Additionally, a fourth sealing member 76 is formed at an outer circumference of the filter head 70 to maintain airtightness between an inner circumference of the head member 30 and the filter head 70 of the filter assembly 60.

At least one connection part 77 is protruded in a radial outward direction from an outer circumference of the filter head 70 so as to secure connection between the filter assembly 60 and the valve assembly 70.

One end of the connection part 77 is formed as a slant surface 78.

The supporting member 80 has the supporting part 84 corresponding to the connection part 77. When the connection part 77 of the filter assembly 60 is disposed corresponding to a connection recess 85 defined as the space between two further supporting parts 84 and then the filter assembly 60 is moved upward, the connection part 77 is disposed at an upper part of the supporting part 84 while pushing the head member 30 upward.

Next, as the filter assembly 60 is rotated in the circumferential direction, the connection part 77 is supported by the supporting part 84 of the supporting member 80 and the lower end of the head member 30, thereby achieving the secure connection between the filter assembly 60 and the valve assembly 70.

Here, more specifically, in case that the filter assembly 60 is circumferentially rotated with the connection part 77 disposed at the same height as the supporting part 84, the slant surface 78 of the connection part 77 is slid up along the supporting part 84. Therefore, the filter assembly 60 is moved up as rotating, thereby pushing the head member 30.

The head member 30 is linearly advanced in association with the rotation of the filter assembly 60, thereby reinforcing the connection.

Thus, when connecting the filter assembly 60 to the valve assembly 10, a user may be able to achieve the connection with a relatively minor force by simply inserting the valve assembly 10 and rotating the filter assembly so that the head member 30 is linearly advanced.

Also, when separating the filter assembly 60 from the valve assembly 10, the user rotates the filter assembly 60 in the direction opposite to the mounting direction and then separates the filter assembly 60 downward from the supporting member 80.

Hereinafter, connection and separation of the water purifying system 10 according to the embodiment of the present invention and the structure of the water purification path will be explained with reference to FIGS. 4, 5, 7 and 8.

First, in a state where the filter assembly 60 is separated from the valve assembly 10, the lower end of the head member 30 is supported by the supporting part 84 of the supporting member 80 as shown in FIGS. 4 and 5. The valve unit 40 closes the inflow path 31 and the outflow path 32 while opening the bypass path A disposed between the outer surface of the head member 30 and the inner surface of the valve cover 20.

Therefore, when a fluid, for example, the raw water, is flown into the valve assembly 10 through the inlet 21, the fluid flows along the bypass path A detouring round the filter assembly 60 and then is discharged through the outlet 22.

For mounting of the filter assembly 60, the connection part 77 of the filter assembly 60 is inserted in the connection recess 85 between two further supporting parts 84 so that the connection part 77 of pushes the lower end of the head member 30, thereby moving the head member 30 upward.

According to the upward movement of the head member 30, the first sealing member 36 mounted at the outer circumference of the cap part 34 seals the space between the outer surface of the head member 30 and the inner surface of the valve cover 20, thereby closing the bypass path A.

Simultaneously, the first opening part 72 and the second opening part 74 of the head member 30 push the lower end of the valve body 41. As the valve body 41 is pushed, the elastic member 42 elastically supporting the valve body 41 is compressed. Therefore, the valve body 41 is moved upward, thereby opening the inflow path 31 and the outflow path 32.

Next, as the filter assembly 60 is rotated in the circumferential direction, the connection part 77 is supported by the supporting part 84 of the supporting member 80 and the lower end of the head member 30. Thus, the filter assembly 60 may be maintained as securely connected with the valve assembly 10 by the supporting member 80.

Furthermore, as the path partition 38 extended at the lower part of the head member 30 is inserted in a gap between the first and second opening parts 72 and 74, the fluid in the inflow path 31 and the fluid in the outflow path 32 may be prevented from mixing together.

In this state, when the fluid such as raw water is flown into the valve assembly 10 through the inlet 21, the fluid flows along the inflow path 31 and is guided into the filter assembly 60 through the second opening 73 and filtered by the filter assembly 60.

The fluid filtered in the filter assembly 60 is discharged to the outflow path 32 through the first opening 71. The fluid flowing along the outflow path 32 is discharged to the outside of the water purifying system through the outlet 22.

To separate the filter assembly 60 from the valve assembly 10 for replacement, the user rotates the filter assembly 60 in the circumferential direction so that the connection part 77 and the supporting part 84 are deviated from each other and then moves the filter assembly 60 downward. Thus, the filter assembly 60 can be separated by a simple operation.

Since the force pushing the valve unit 40 is relieved as the filter assembly 60 is separated, the valve body 41 is moved down by an elastic recovery force of the elastic member 42, thereby closing the inflow path 31 and the outflow path 32.

When the raw water is supplied through the inlet 21 in this state, the head member 30 is slid down by the pressure of the raw water. In addition, the first sealing member 36 is distanced from the inner surface of the valve cover 20, thereby opening the bypass path A. Therefore, the raw water bypasses the filter assembly 60 and is discharged out of the water purifying system through the outlet 22.

As is apparent from the above description, a water purifying system according to the embodiment of the present invention, a filter assembly is connected to a valve assembly through a linear motion, and a fluid guided in through an inlet may be purified and discharged by a relatively simple operation of the filter assembly.

When the filter assembly is connected, opening of an inflow path and an outflow path may be achieved by moving a head member of a valve assembly upward by a predetermined distance. Therefore, a relative movement of the valve assembly is minimized during connection of the filter assembly, thereby improving durability of the valve assembly.

On the other hand, when the filter assembly is separated from the valve assembly, the inflow path and the outflow path are closed by a simple mechanical operation while simultaneously opening a bypass path formed between a valve cover and the head member.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A water purifying system comprising:
 a valve assembly which includes a valve cover defining an external appearance of the water purifying system and including an inlet and an outlet provided at an upper part of the valve cover, a head member mounted to be movable in up and down directions within the valve cover to form an inflow path and an outflow path respectively in fluid communication with the inlet and the outlet, and a pair of valve units mounted to the head member to open and close the inflow path and the outflow path, respectively;
 a filter assembly removably connected to the valve assembly and comprising a filter therein,
 wherein the filter assembly linearly advances the head member when the filter assembly is connected to the valve assembly through a linear motion, so that a fluid passing through the inlet is passed through the filter and then guided to the outlet, and
 the head member is retreated linearly when the filter assembly is separated from the valve assembly, so that the fluid passing through the inlet is guided to the outlet without passing through the filter.

2. The water purifying system according to claim 1, wherein the head member seals a space between an outer surface of the head member and an inner surface of the valve cover by linearly moving.

3. The water purifying system according to claim 1, further comprising:
 a supporting member provided to the valve assembly to support a secure mounting of the filter assembly with respect to the valve assembly.

4. The water purifying system according to claim 3, wherein the filter assembly is inserted in the valve assembly through the supporting member and rotated, thereby being fixed to the supporting member.

5. The water purifying system according to claim 1, wherein the valve assembly includes the inflow path, the outflow path, and a bypass path formed between an inner surface of the valve cover and the head member, and
 the inflow path, the outflow path and the bypass path are selectively opened and closed.

6. The water purifying system according to claim 5, wherein, when the filter assembly is mounted, the valve unit opens the inflow path and the outflow path and an outer surface of the head member is brought into close contact with the inner surface of the valve cover, thereby closing the bypass path, and
 when the filter assembly is separated, the valve unit closes the inflow path and the outflow path and the outer surface of the head member is distanced from the inner surface of the valve cover, thereby opening the bypass path.

7. The water purifying system according to claim 1, wherein the filter assembly includes a filter head connected to the valve assembly, and
 the filter head includes a first opening part having a portion protruded in the center thereof to define a first opening formed on an upper surface thereof, and a second opening part formed around the first opening part with a plurality of second openings circumferentially arranged at predetermined intervals on the upper surface thereof.

8. The water purifying system according to claim 7, wherein the first opening part includes a sealing member mounted at an outer circumference thereof to partition the inflow path from the outflow path.

9. The water purifying system according to claim 7, further comprising a supporting member that supports a secure mounting of the filter assembly with respect to the valve assembly,
 wherein the filter head includes a connection part engaged with the supporting member.

10. A valve assembly formed with a water purification path and a bypass path therein which are selectively opened and closed in accordance with a linear motion of a filter assembly, the valve assembly comprising:
 a valve cover defining an external appearance of the valve assembly;
 a head member mounted to be movable in up and down directions within the valve cover to open and close the bypass path located at the upper part of the valve cover; and
 a pair of valve units mounted to the head member to open and close the water purification path.

11. The valve assembly according to claim 10, wherein the head member further comprises a first sealing member that closes the bypass path when the head member is moved upward.

12. The valve assembly according to claim 10, wherein each of the pair of valve units comprises a valve body, an elastic member supplying elastic bias in a direction for the valve body to close the inflow path, and a second sealing member disposed between the valve body and the water purification path to maintain airtightness between the valve body and the water purification path as long as no external force is applied.

* * * * *